United States Patent [19]

Yagi et al.

[11] Patent Number: 5,015,525
[45] Date of Patent: May 14, 1991

[54] POLYOLEFIN FIBER HAVING IMPROVED INITIAL ELONGATION AND PROCESS FOR PREPARATION THEREOF

[75] Inventors: Kazuo Yagi, Ohtake; Hiroyuki Takeda, Ohno, both of Japan

[73] Assignee: Mitsui Petrochemical Industries Ltd., Tokyo, Japan

[21] Appl. No.: 279,084

[22] Filed: Dec. 2, 1988

[30] Foreign Application Priority Data

Dec. 3, 1987 [JP] Japan .................. 62-304484

[51] Int. Cl.$^5$ .................................................. D02G 3/00
[52] U.S. Cl. ............................ 428/364; 264/210.8; 264/290.5; 428/373; 428/224; 525/240
[58] Field of Search ................. 428/364, 373; 525/240

[56] References Cited

U.S. PATENT DOCUMENTS

| | | | |
|---|---|---|---|
| 4,344,908 | 8/1982 | Smith et al. | 264/290.5 X |
| 4,422,993 | 12/1983 | Smith et al. | 264/290.5 X |
| 4,455,273 | 6/1984 | Harpell et al. | 264/203 X |
| 4,504,432 | 3/1985 | Kamei et al. | 264/177 |
| 4,737,402 | 4/1988 | Harpell et al. | 428/246 X |
| 4,842,922 | 6/1989 | Krupp et al. | 428/198 |

Primary Examiner—Lorraine T. Kendell

[57] ABSTRACT

Disclosed is a polyolefin fiber having an improved initial elongation, which comprises a strongly drawn body of a composition comprising ultra-high-molecular-weight polyethylene and an ultra-high-molecular-weight copolymer of ethylene with an olefin having at least 3 carbon atoms at such a ratio that the content of the olefin having at least 3 carbon atoms in the entire composition is such that the number of side chains per 1000 carbon atoms in the composition is 0.2 to 5.0 on the average, and having an intrinsic viscosity $[\eta]$ of at least 5 dl/g as the entire composition, wherein the strongly drawn body has at least two crystal melting endothermic peaks, close to each other, in the region of temperatures higher by at least 15° C. than the inherent crystal melting temperature (Tm) of the composition determined as the main melting endothermic peak at the second temperature elevation when measured in the restrained state by a differential scanning calorimeter.

5 Claims, 6 Drawing Sheets

CREEP CHARACTERISTICS (70°C, 30% LOAD)

CREEP CHARACTERISTICS (70°C, 30% LOAD)

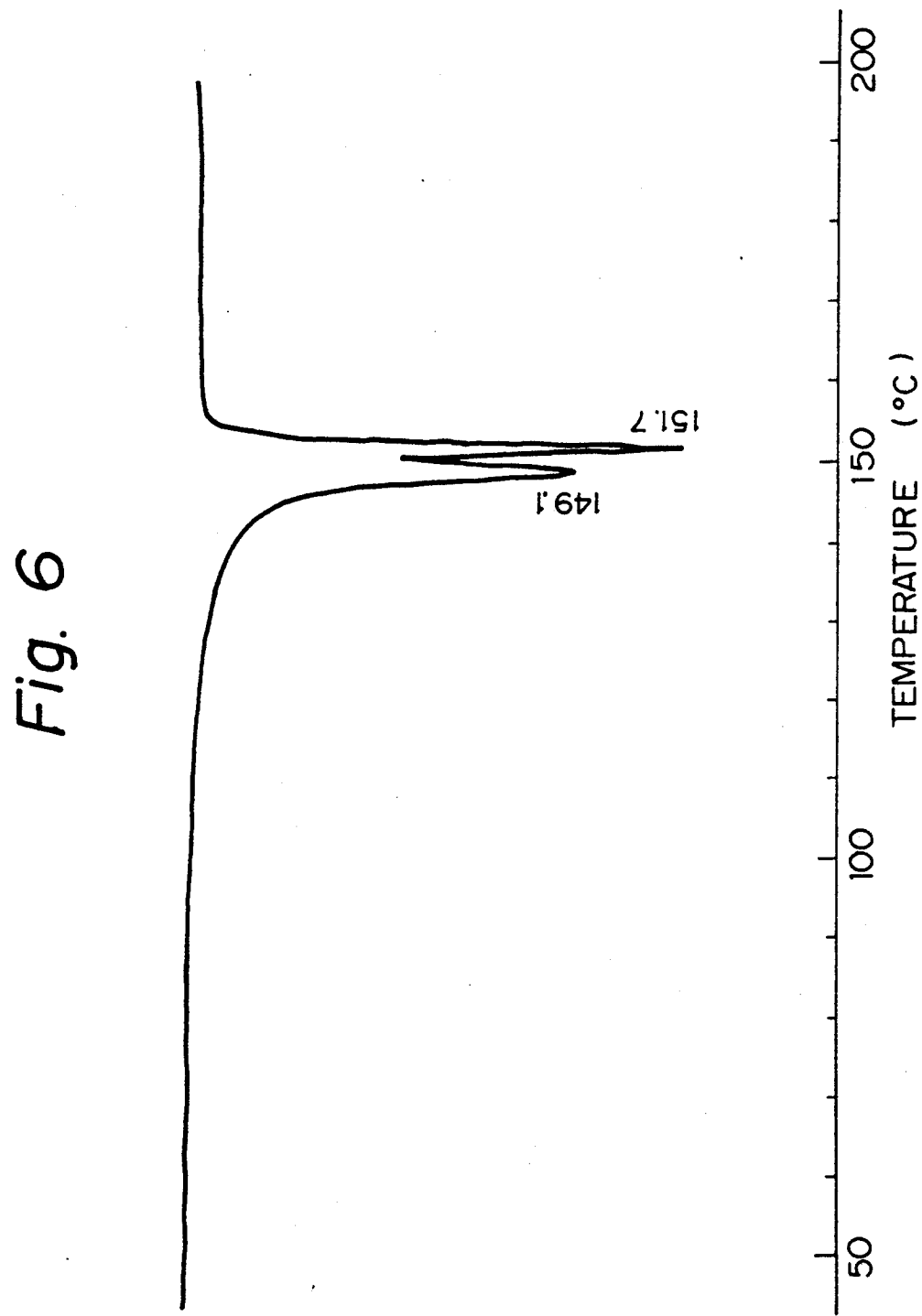

POLYOLEFIN FIBER HAVING IMPROVED INITIAL ELONGATION AND PROCESS FOR PREPARATION THEREOF

BACKGROUND OF THE INVENTION

1. Field of the Invention

The present invention relates to a high-strength polyolefin fiber having an improved initial elongation and a process for the preparation thereof.

2. Description of the Related Art

It is known that a molecularly oriented shaped body having high elastic modulus and high tensile strength is obtained by shaping ultra-high-molecular-weight polyethylene into a fiber, a tape or the like and drawing the shaped body. For example, Japanese Patent Application Laid-Open Specification No. 15408/81 discloses a process in which a dilute solution of ultra-high-molecular-weight polyethylene is spun and the obtained filament is drawn. Futhermore, Japanese Patent Application Laid-Open Specification No. 130313/84 discloses a process in which ultra-high-molecular-weight polyethylene is melt-kneaded with a wax and the kneaded mixture is extruded, cooled, solidified and then drawn. Moreover, Japanese Patent Application Laid-Open Specification No. 187614/84 discloses a process in which a melt-kneaded mixture as mentioned above is extruded, drafted, cooled, solidified and then drawn.

If ultra-high-molecular-weight polyethylene is shaped into a fiber and the fiber is strongly drawn, the elastic modulus and tensile strength are increased with increase of the draw ratio. This drawn fiber has good mechanical properties such as high elastic modulus and high tensile strength and is excellent in light weight characteristic, water resistance and weatherabililty. However, this drawn fiber is still insufficient and defective in that the initial elongation is large and the creep resistance is poor.

The initial elongation is a phenomenon which is peculiarly and commonly observed in organic fibers, and this phenomenon is observed even in rigid high polymers such as a Kevlar fiber (wholly aromatic polyamide fiber). Especially in the above-mentioned polyethylene fiber having high elastic modulus and high strength, the initial elongation is so large as about 1% at normal temperature, and a high elastic modulus cannot be sufficiently utilized in the field of, for example, a composite material or the like. More specifically, influences by this large initial elongation are serious in fiber-reinforced resin composite materials, tension members (optical fiber cords) and the like.

SUMMARY OF THE INVENTION

It is therefore a primary object of the present invention to provide a polyolefin fiber which is highly improved in the initial elongation and creep resistance and has high strength and elastic modulus and a process for the preparation of this polyolefin fiber.

More specifically, in accordance with one aspect of the present invention, there is provided a polyolefin fiber having an improved intitial elongation, which comprises a strongly drawn body of a composition comprising ultra-high-molecular-weight polyethylene and an ultr-high-molecular-weight copolymer of ethylene with an olefin having at least 3 carbon atoms at such a ratio that the content of the olefin having at least 3 carbon atoms in the entire composition is such that the number of side chains per 1000 carbon atoms in the composition is 0.2 to 5.0 on the average, and having an intrinsic viscosity $[\eta]$ of at least 5 dl/g as the entire composition, wherein the strongly drawn body has at least two crystal melting endothermic peaks, close to each other, in the region of temperature higher by at least 15° C. than the inherent crystal melting temperature (Tm) of the composition determined as the main melting endothermic peak at the second temperature elevation when measured in the restrained state by a differential scanning calorimeter.

In accordance with another aspect of the present invention, there is provided a process for the preparation of a polyolefin fiber having an improved initial elongation, which comprises melt-kneading a composition comprising ultra-high-molecular-weight polyethylene having a intrinsic viscosity $[\eta]$ of at least 5 dl/g, and an ultra-high-molecular-weight ethylene/α-olefin copolymer having an intrinsic viscosity $[\eta]$ at least 5 dl/g, said α-olefin having at least 3 carbon atoms, and having such a content of the α-olefin having at least 3 carbon atoms that the number of side chains of the α-olefin per 1000 carbon atoms in the copolymer is 0.5 to 10 on the average, at a weight ratio of from 10/90 to 90/10, in the presence of a diluent, spinning the kneaded mixture and drawing the obtained fiber at a draw ratio of at least 10.

When a load corresponding to 30% of the breaking load at room temperature is applied to the polyolefin fiber of the present invention at a sample length of 1 cm and an ambient temperature of 70° C., the initial elongation after 60 seconds from the point of the initiation of the load is lower than 5% and the average creep speed during the period of from the point of 90 seconds from the initiation of application of the load to the point of 180 seconds from the initiation of application of the load is lower than $1 \times 10^{-4}$ sec$^{-1}$. These characteristics of the fiber of the present invention are quite surprising.

BRIEF DESCRIPTION OF THE DRAWINGS

FIGS. 2, 3, 4, 5 and 6 are differential thermal curves of the foregoing samples (1) through (5).

DETAILED DESCRIPTION OF THE PREFERRED EMBODIMENTS

The present invention is based on the finding that a composition comprising ultra-high-molecular-weight polyethylene and an ultra-high-molecular-weight copolymer of the ethylene with an α-olefin having at least 3 carobn atoms (hereinafter referred to as "ultra-high-molecular-weight ethylene/α-olefin copolymer") at a certain blend ratio is excellent in the spinnability and drawability and can be easily shaped in a strongly drawn shaped body, and this drawn shaped body has very high elastic modulus and strength and also has excellent creep resistance and in this drawn shaped body, the initial elongation is controlled to a very low level.

Ultra-high-molecular-weight polyethylene can be drawn at a high draw ratio and the fiber obtained at a high draw ratio shows high strength and high elastic modulus, but the drawn fiber is defective in that the creep resistance is poor. On the other hand, a fiber of an ultra-high-molecular-weight ethylene/α-olefin copolymer has an excellent creep resistance, but the drawability is not sufficient and a yarn having high strength and high elastic modulus can hardly be obtained. A highly drawn fiber comprising ultra-high-molecular-weight polyethylene and an ultra-high-molecular-weight ethylene/α-olefin copolymer at a certain weight ratio according to the present invention has high strength and high elastic modulus of the former polymer and high creep resistance of the latter polymer synergistically and moreover, the initial elongation is drastically reduced in this drawn fiber. These characteristics are quite surprising.

Figure 1:
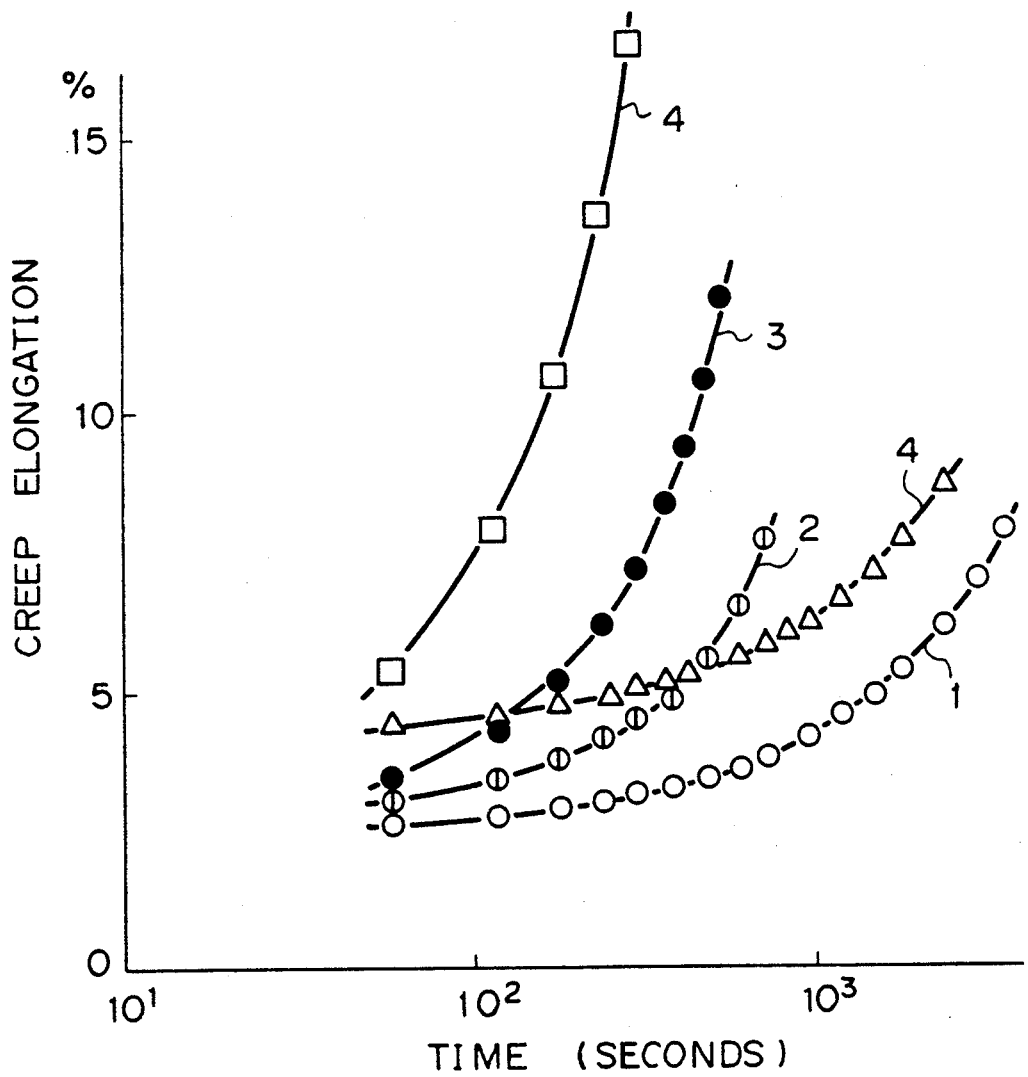
FIG. 1 is a graph illustrating the creep characteristics of an ultra-high-molecular-weight polyethylene fiber (4), and ultra-high-molecular-weight ethylene/butene-1 copolymer fiber (5) and fibers (1) through (3) of compsitions of both the polymers.
Figure 2:
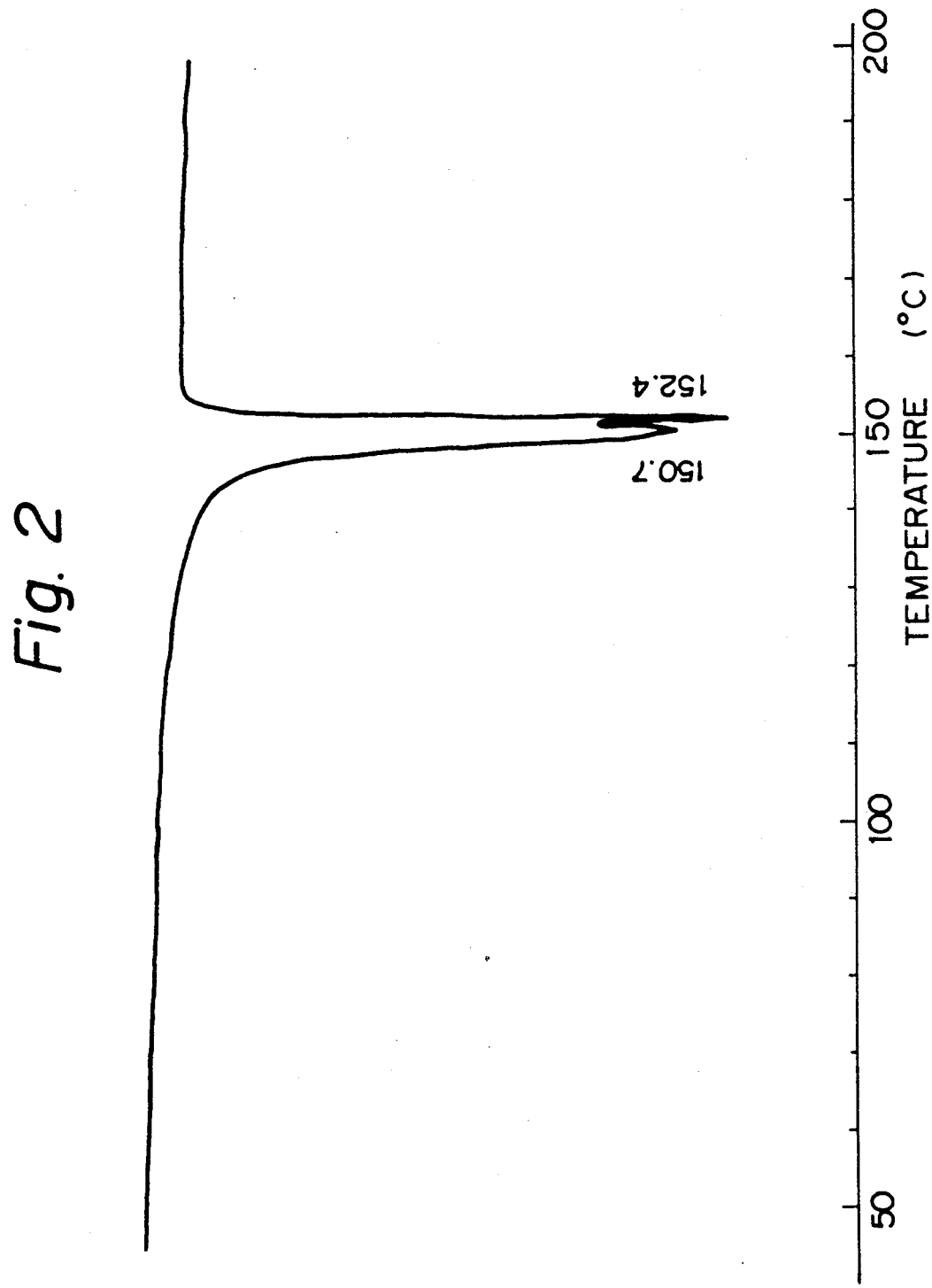
Figure 3:
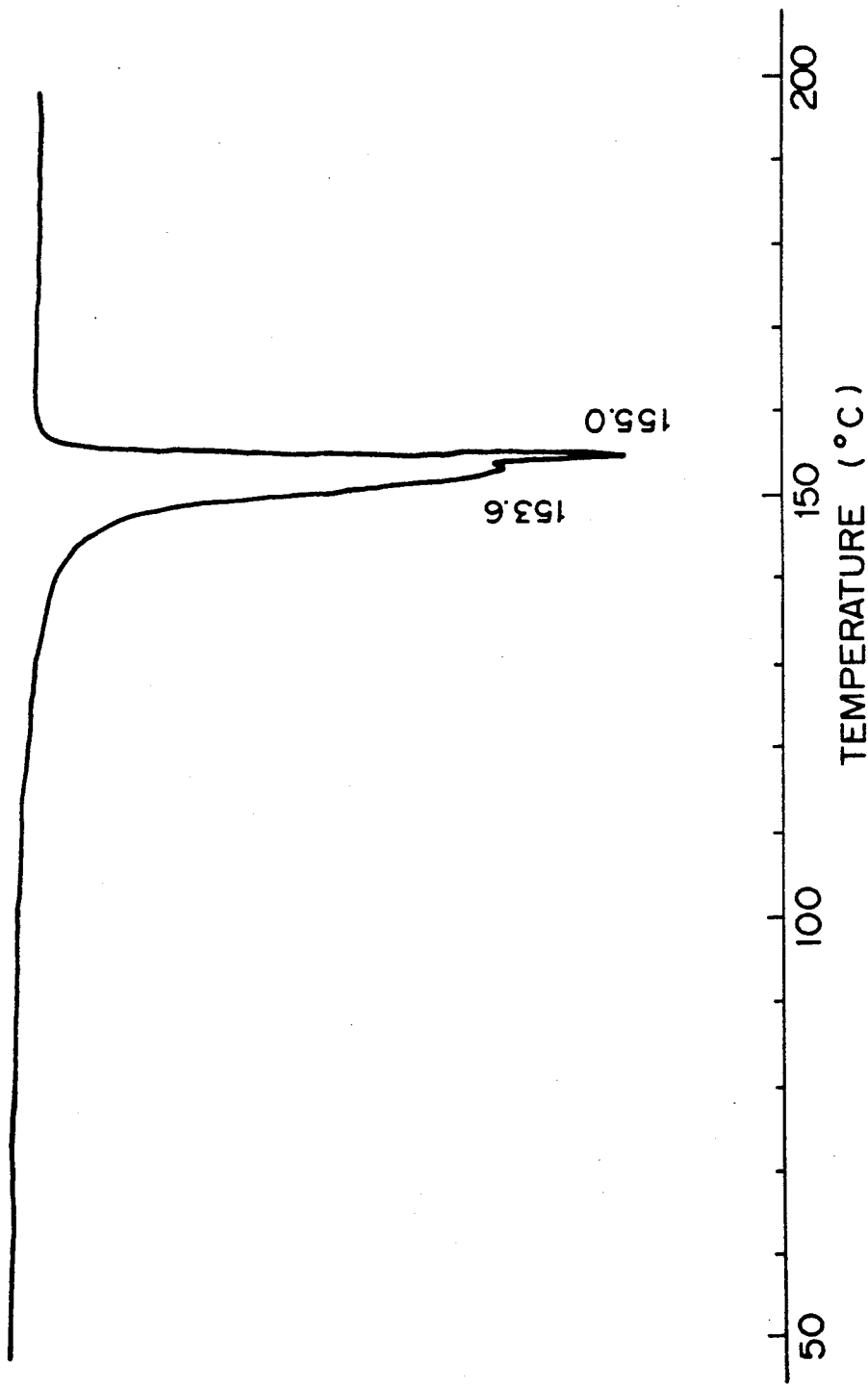
Figure 4:
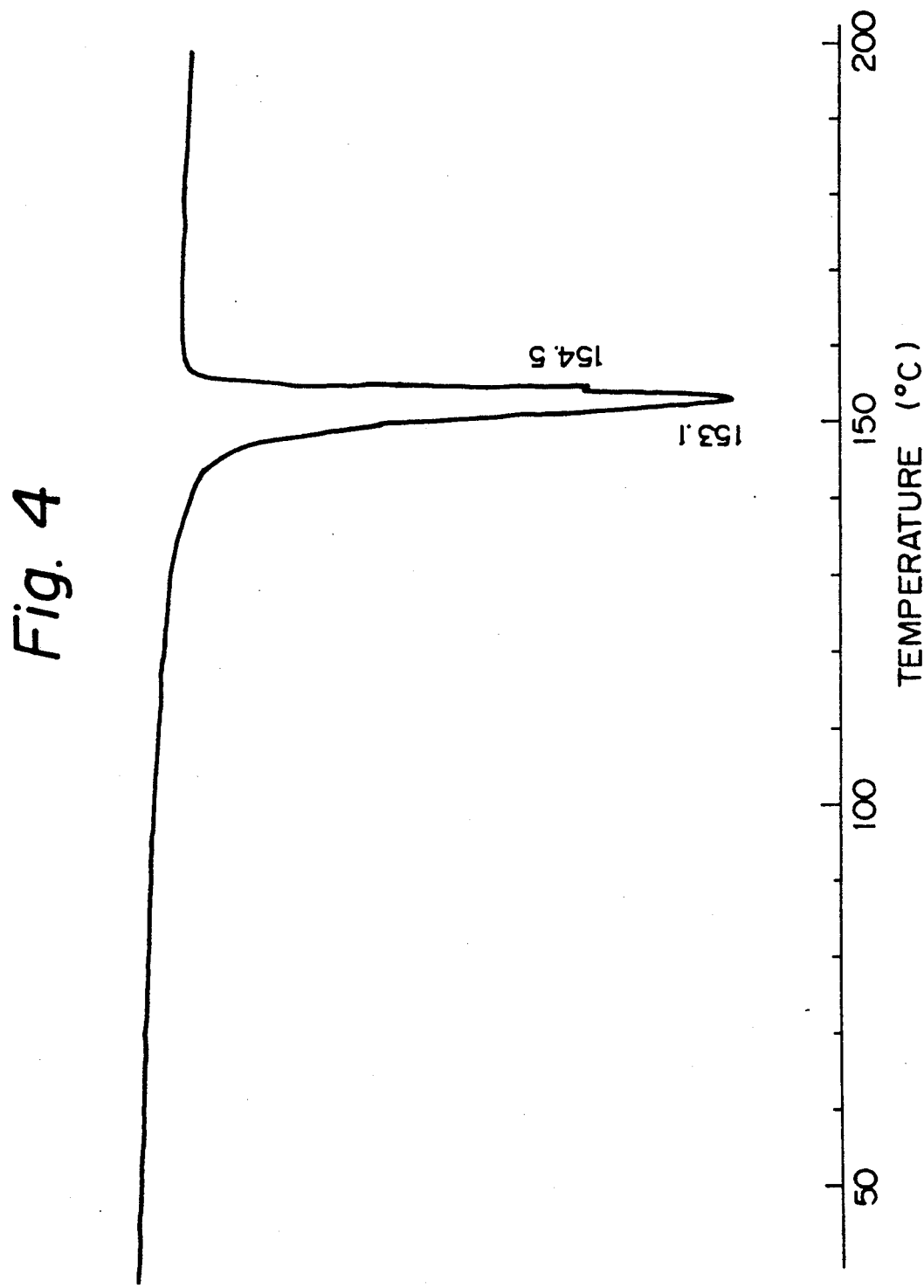
Figure 5:
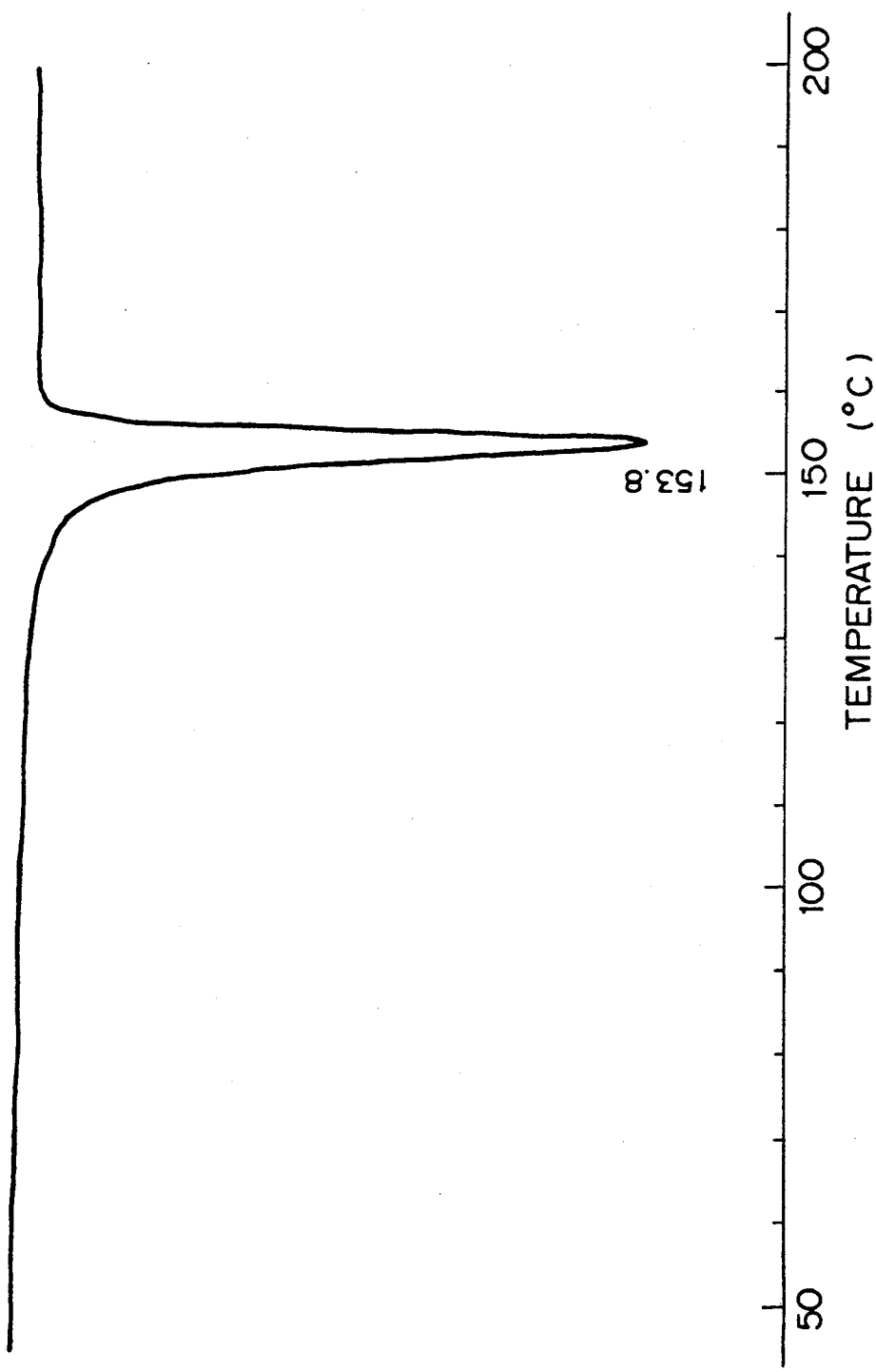

FIG. 1 illustrates the relation between the time elapsing after application of the load and the creep elongation, which is observed with respect to various highly drawn polyolefin fiber when a load corresponding to 30% of the breaking load at room temperature is applied at a sample length of 1 cm and an ambient temperature of 70° C. In FIG. 1, sample (4) is an ultra-high-molecular-weight polyethylene fiber, sample (5) is an ultra-high-molecular-weight ethylene/butene-1 copolymer fiber, and samples (1), (2) and (3) are fibers of compsitions comprising the above-mentioned ultra-high-molecular-weight polyethylene and ultra-high-molecular-weight ethylene/butene-1 copolymer at weight ratios of 10/20, 15/15 and 20/10, respectively. In short, the creep characteristics of these fibers are shown in FIG. 1. Incidentally, the respective samples are described in detail in the examples given hereinafter.

From the results shown in FIG. 1, it is seen that in the after of the compsition of the present invention, the initial elongation (the elongation after 60 seconds from the point of the initiation of application of the load) is controlled to a much lower level even under an accelerated condition of 70° C. than in the fibers composed solely of the respective components.

FIGS. 2, 3, 4, 5 and 6 are temperature-melting thermal curves measured by a differential scanning calorimeter with respect to fibers (multifilaments) of samples (1) through (5) used for the measurement of FIG. 1 in the state where the sample is wound on an aluminum sheet having a thickness of 0.2 mm and the end is restrained. The crystal melting temperatures (Tm) of samples (1) through (3) according to the present invention, as determined as the main melting endothermic peak as the second temperature elevation are 135.0° C., 135.6° C. and 136.2° C., respectively. Accordingly, it is seen that the fiber of the present invention has, in the restrained state, a crystal melting peak only in the region of temperatures substantially higher by at least 15° C. than Tm and this peak appears as at least two peaks close to each other. This crystal melting characteristics has a close relation to drastic reduction of the initial elongation.

The fact that in the polyolefin fiber of the present invention, the initial elongation is controlled to a very small value by blending the two components was accidentally found as a phenomenon, and the reason is still unknown. However, it is presumed that the reason will probably be as follows, though the reason described below is not binding one. In general, a drawn fiber has a structure in which the polymer chain passes through a crystalline zone and an amorphous zone alternately and the crystalline zone is oriented in the drawing direction, and it is considered that it is the amorphous zone that has influences on the initial elongation of the fiber. In the polyolefin fiber of the present invention, since the fiber comprises ultra-high-molecular-weight polyethylene and an ultra-high-molecular-weight ethylene/α-olefin copolymer, a crystal structure different from the crystal of polyethylene is introduced into the portion to be inherently formed into an amporphous zone or the length of the amorphous zone is shortened. It is considered that for this reason, the initial elongation can be reduced. As pointed out hereinbefore, the results of the differential thermal analysis of the polyolefin fiber of the present invention indicate formation of two phases of crystals differing in the melting peak.

From the viewpoint of the mechanical properties of the fiber, it is important that the polyolefin composition constituting the fiber of the present invention, as a whole, should have an intrinsic viscosity of at least 5 dl/g, especially 7 to 30 dl/g. Since the molecule ends do not participate in the strength of the fiber and the number of the molecule ends is a reciprocal number of the molecular weight (viscosity), it is seen that a higher intrinsic viscosity $[\eta]$ gives a higher strength.

In the present invention, it is important that the polyolefin compsition should comprise the ultra-high-molecular-weight ethylene/α-olefin copolymer in such an amount that the number of branched chains per 1000 carbon atoms in the composition is 0.2 to 5.0 on the average, especially 0.5 to 0.3 on the average. If the number of branched chains is too small and below the above-mentioned range, it is difficult to form an internal structure of the fiber effective for reducing the initial elongation and improving the creep resistance. In contrast, if the number of branched chains is too large and exceeds the above-mentioned range, the crystallinity is drastically degraded and it is difficult to obtain high elastic modulus and strength. In the present invention, determination of branched chains of the composition is carried out by using an infrared spectrophotoscope (supplied by Nippon Bunko Kogyo). More specifically, the absorbance at 1378 cm$^{-1}$ based on the deformation vibration of the methyl group at the end of the branch of the α-olefin introduced in the ethylene chain is measured and the number of branched methyl groups per 1000 carbon atoms can be easily obtained from the measured value with reference to a calibration curve prepared in advance by using a model compound in a $^{13}$C magnetic resonance apparatus.

The present invention will now be described in detail.

Starting Materials

The ultra-high-molecular-weight polyethylene used in the present invention is known, and any of known polymers can be optionally used. In order to obtain a fiber having high strength and high elastic modulus, it is preferred that the intrinsic viscosity of the ultra-high-molecular-weight polyethylene be at least 5 dl/g, especially 7 to 30 dl/g.

From the same viewpoint, the ultra-high-molecular-weight ethylene/α-olefin copolymer as the other component should also have an intrinsic viscosity $[\eta]$ of at least 5 dl/g, especially 7 to 30 dl/g. What must be taken into consideration here is that if the difference of the molecular weight between the ultra-high-molecular-weight polyethylene and the ultra-high-molecular-weight ethylene/α-olefin copolymer is too large, the creep resistance of the final fiber tends to decrease. Accordingly, it is preferred that the difference of the intrinsic viscosity between both the resins be smaller than 5 dl/g, especially smaller than 3 dl/g.

As the olefin having at least 3 carbon atoms, there can be used at least one member selected from mono-olefins such as propylene, butene-1, pentene-1, 4methlpentene-1, hexene-1, heptene-1 and octene-1. Furthermore, hydrocarbons having at least two unsaturated bonds in the molecule, preferably at least two double bonds, can be used. For example, there can be mentioned conjugated diene type hydrocarbon compounds such as 1,3-butadiene, 2-methyl-2,4-pentadiene, 2,3-dimethyl-1,3butadiene, 2,4-hexadiene, 3-methyl-2,4-hexadiene, 1,3-pentadiene and 2-methyl-1,3-butadiene, non-conjugated diene type hydrocarbon compounds such as 1,4-pentadiene, 1,5-hexadiene, 1,6-heptadiene, 1,7-octadiene, 2,5-dimethyl-1,5-hexadiene, 4-methyl-1,4-hexadiene, 5-methyl-1,4-hexadiene, 4-ethyl-1,4-hexadiene, 4,5-dimethyl-1,4-hexadiene, 4-methyl-1,4-heptadiene,4-ethyl-1,4-heptadiene, 5-methyl-1,4-heptadiene, 4-ethyl-1,4-hexadiene, 5-methyl-1,4-octadiene and 4-n-propyl-1,4-decadiene, conjugated polyolefin type hydrocarbon compounds such as 1,3,5-hexatriene, 1,3,5,7-octatetraene and 2-vinyl-1,3-butadiene, non-conjugated polyolefin type hydrocarbon compounds such as squalene, and divinylbenzene and vinylnorbornene.

The ultra-high-molecular-weight ethylee/α-olefin copolymer used in the present invention is obtained by slurry-polymerizing ethylene and an α-olefin having at least 3 carbon atoms as the comonomer in an organic solvent by using a Ziegler type catalyst.

In this case, the amount used of the olefin comonomer should be such that the number of side chains (branched chains) per 1000 carbon atoms in the final composition is 0.2 to 5, especially 0.5 to 3.

The ethylene/α-olefin copolymer most effective for attaining the object of the present invention is an ethylene/butene-1 copolymer, and an ethylene/4-methylpentene-1 copolymer, an ethylene/hexene-1 copolymer, and ethylene/octene-1 copolymer, an ethylene/-propylene copolymer, and ethylene/propylene/4-methylpentene-1 copolymer and an ethylene/1,5-hexadiene copolymer are advantageously used. These ultra-high-molecular-weight ethylene/α-olefin copolymers can be used singly or in the form of mixtures of two or more of them.

Preparation Process

In the present invention, the ultra-high-molecular-weight polyethlene (A) is combined with the ultra-high-molecular-weight ethylene/α-olefin copolymer (B) at a weight ratio (A)/(B) of from 10/90 to 90/10, especially from 20/80 to 80/20, so that the content of the α-olefin having at least 3 carbon atoms is such that the number of branched chains per 1000 carbon atoms is within the above-mentioned range.

In order to make melt-shaping of the ultra-high-molecular-weight olefin resin possible, a diluent is incorporated into the composition of the present invention. Solvents for the ultra-high-molecular-weight olefin resin composition and various waxy substances having a compatibility with the ultra-high-molecular-weight olefin resin composition are used as the diluent.

A solvent having a boiling point higher, especially by at least 20° C., than the melting point of the above-mentioned copolymer is preferably used.

As specific examples of the solvent, there can be mentioned aliphatic hydrocarbon solvents such as n-nonane, n-decane, n-undecane, n-dodecane, n-tetradecane, n-octadecane, liquid paraffin and kerosene, aromatic hydrocarbon solvents such as xylene, naphthalene tetralin, butylbenzene, p-cymene, cyclohexylbenzene, diethylbenzene, pentylbenzene, dodecylbenzene, bicyclohexyl, decalin, methylnaphathalene and ethynaphthalene, hydrogenated derivatives thereof, halogenated hydrocarbon solvents such as 1,1,2,2-tetrachloroethane, pentachloroethane, hexachloroethane, 1,2,3-trichloropropane, dichlorobenzene, 1,2,4-trichlorobenzene and bromobenzene, and mineral oils such as paraffin type process oil, naphthene type process oil and aromatic process oil.

Aliphatic hydrocarbon compounds and derivatives thereof are used as the wax.

The aliphatic hydrocarbon compound is a so-called paraffin wax composed mainly of a staurated aliphatic hydrocarbon compound and having a molecular weight lower than 2000, preferably lower than 1000, especially preferably lower than 800. As specific examples of the aliphatic hydrocarbon compound, there can be mentioned n-alkanes having at least 22 carbon atoms, such as docosane, tricosane, tetracosane and triacontane, mixtures containing an n-alkane as mentioned above as the main component and a lower n-alkane, so called paraffing waxes separated and purified from petroleum, low-pressure and medium-pressure polyolefin waxes which are low-molecular-weight polymers obtained by polymerizing ethylene or copolymerizing ethylene with other α-olefin, high-pressure polyethylene waxes, ethylene copolymer waxes, waxes obtained by reducing the molecular weight of polyethylene such as medium-pressure, low-pressure or high-pressure polyethylene by thermal degradation or the like, and oxidized waxes and maleic acid-modified waxes obtained by oxidizing the foregoing waxes or modifying the foregoing waxes with maleic acid.

As the hydrocarbon derivative, there can be mentioned fatty acids, aliphatic alcohols, fatty acid amides, fatty acid esters, aliphatic mercaptans, aliphatic aldehydes and aliphatic ketones having at least 8 carbon atoms, preferably 12 to 50 carbon atoms, or a molecular weight of 130 to 2000, preferably ⓡto 800, which are compounds having at the terminal of an aliphatic hydrocarbon group (such as an alkyl or alkenyl group) or in the interior thereof, at least one, preferably one or two, especially preferably one, of functional groups such as a carboxyl group, a hydroxyl group, a carbamoyl group, and ester group, a mercapto group and a carbonyl group.

As specific examples, there can be mentioned fatty acids such as capric acid, lauric acid, myristic acid, palmitic acid, stearic acid and oleic acid, aliphatic alchols such as lauryl alchol, myristyl alcohol, cetyl alcohol and stearyl alcohol, fatty acid amides such as caprylamide, laurylamide, palmitylamide and stearylamide, and fatty acid esters such as stearyl acetate.

The ratio between the ultra-high-molecular-weight olefin resin composition and the diluent differs according to the kinds of them, but it is generally preferred that the above-mentioned ratio is in the range, of from 3/97 to 80/20, especially from 15/85 to 60/40. If the amount of the dilluent is too small and below the above-mentioned range, the melt viscosity becomes too high, and melt kneading or melt shaping becomes difficult and such troubles as surface roughening of the shaped body and breaking at the drawing step are often caused. If the amount of the diluent is too large and exceeds the above-mentioned range, melt kneading is difficult and the drawability of the shape body is poor.

It is preferred that melt kneading be carried out at a temperature of 150° to 300°C., especially 170° to 270° C. If the temperature is too low and below the above-mentioned range, the melt viscosity is too high and melt shaping becomes difficult. If the temperature is too high and exceeds the above-mentioned range, the molecular weight of the ultra-high-molecular-weight olefin compositon is reduced by thermal degradation and a shaped body having a high elastic modulus and a high strength can hardly be obtained. Mixing can be accomplished by dry blending using a Henschel mixer or a V-type blender or by melt mixing using a single-screw or multiple-screws extruder.

Melt shaping is generally accomplished according to the melt extrusion shaping method. For example, filaments to be drawn can be obtained by melt extrusion through a spinneret. In this case, a melt extruded from a spinneret may be drafted, that is, elongated in the molten state. The draft ratio can be defined by the following formula $$\text{draft ratio} = V/Vo \quad (1)$$

wherein Vo stands for the extrusion speed of the molten resin in a die orifice and V for the winding speed of the cooled and solidified undrawn body.

The draft ratio is changed according to the temperature of the mixture, the molecular weight of the ultra-high-molecular-weight olefin resin composition and the like, but the draft ratio can be ordinarily adjusted to at least 3, preferably at least 6.

The so-obtained undrawn shaped body of the ultra-high-molecular-weight olefin resin composition is subjected to a drawing operation. The degree of drawing is, of course, such that a molecular orientation is effectively given in at least one axial direction of the drawn fiber of the ultra-high-molecular-weight olefin composition.

It is generally preferred that drawing of the shaped bofy of the ultra-high-molecular-weight olefin resin composition be carried out at 40° to 160° C., especially 80° to 145° C. As the heating medium for heating and maintaining the undrawn shaped body at the above-mentioned temperature, there can be used any of air, steam and liquid media. If the drawing operation is carried out by using, as the heating medium, a medium capable of removing the above-mentioned diluent by extraction and having a boiling point higher than that of the composition constituting the shaped body, such as decalin, decane or kerosene, removal of the diluent becomes possible, and drawing unevenness can be eliminated at the drawing step and a high draw ratio can be adopted. Accordingly, use of the above-mentioned medium is preferred.

The means for removing the excessive diluent from the ultra-high-molecular-weight olefin resin composition is not limited to the above-mentioned method. For example, the excessive diluent can be effectively removed according to a method in which the undrawn shaped body is treated with a solvent such as hexane, heptane, hot ethanol, chloroform or benzene and is then drawn, or a method in which the drawn shaped body is treated with a solvent such as hexane, heptane, hot ethanol, chloroform or benzene, whereby a drawn shaped body having a high elastic modulus and a high strength can be obtained.

The drawing operation can be performed in a single stage or two or more stages. The draw ratio depends on the desired molecular orientation and the effect of improving the melting temperature characteristic by the molecular orientation. In general, however, satisfactory results can be obtained if the drawing operation is carried out so that the draw ratio is 5 to 80, especially 10 to 50.

In general, multi-staged drawing conducted in at least two stags is advantageous. Namely, it is preferred that at the first stage, the drawing operation be carried out at a relatively low temperature of 80 to 120° C. while extracting the diluent contained in the extruded shaped body and at the second and subsequent stages, drawing of the shaped body be carried out at a temperature of 120° to 160° C., which is higher than the drawing temperature adopted at the first stage.

The uniaxial drawing operation for a filament can be accomplished by stretch-drawing between rollers differing in the peripheral speed.

The so-obtained molecularly oriented shaped body can be heat-treated under restrained conditions, if desired. This heat treatment is generally carried out at a temperature of 140° to 180° C., especially 150° to 175° C., for 1 to 20 minutes, especially 3 to 10 minutes. By this heat treatment, crystallization of the oriented crystal zone is further advanced, the crystal melting temperature is shifted to the high temperature side, and the strength and elastic modulus and the creep resistance at high temperatures are improved.

Drawn Fiber

As pointed out hereinbefore, the drawn fiber of the present invention is characterized in that the fiber has at least two crystal melting endothermic peaks, close to each other, in the region of temperatures higher by at least 15° C. than the crystal melting temperature (Tm) of polyethylene determined as the main melting endothermic peak at the second temperature elevation, when measured in the restrained state by a differential scanning calorimeter. By dint of this specific crystal structure, the fiber of the present invention can have such surprising characteristics that when a load corresponding to 30% of the breaking load at room temperature is applied at a sample length of 1 cm and an ambient temperature of 70° C., the initial elongation after 60 seconds from the point of the initiation of application of the load is lower than 5%, especially lower than 4%, and the average creep speed during the period of from the point of 90 seconds from the initiation of application of the load to the point of 180 seconds from the initiation of application of the load is lower than $1 \times 10^{-4}$ sec$^{-1}$, especially lower than $7 \times 10^{-5}$ sec$^{-1}$.

The inherent crystal melting temperature (Tm) of the ultra-high-molecular-weight olefin resin composition can be determined according to a method in which the shaped body is completely molten once and then cooled to moderate the molecular orientation in the shaped body and the temperature is elevated again, that is, by the second run in a so-called differential scanning calorimeter.

In the present invention, the melting point and crystal melting peak are determined according to the following methods.

The melting point is measured by using a differential scanning calorimeter (Model DSC II supplied by Perkin-Elmar) in the following manner. About 3 mg of a sample was wound on an aluminum plate having a size of 4 mm×4 mm×0.2 mm (thickness) to restrain the sample in the orientation direction. Then, the sample wound on the aluminum plate is sealed in an aluminum pan to form a measurement sample. The same aluminum plate is sealed in an empty aluminum pan to be placed in a reference holder, whereby a thermal balance is maintained. At first, the sample is maintained at 30° C. for about 1 minute, and then, the temperature is elevated to 250° C. at a temperature-elevating rate of 10° C./min to complete the measurement of the melting point at the first temperature elevation. Subsequently, the sample is maintained at 250° C. for 10 minutes, and the temperature is dropped at a temperature-dropping rate of 20° C./min and the sample is maintained at 30° C. for 10 minutes. Then, the second temperature elevation is carried out by elevating the temperature to 250° C. at a temperature-elevating rate of 10° C./min to complete the measurement of the melting point at the second temperature elevation (second run). The maximum value of the melting peak is designated as the melting point. In the case where the peak appears as a shoulder, tangential lines are drawn on the bending point just on the low temperature side of the shoulder and on the bending point just on the high temperature side of the shoulder, and the point of intersection is designated as the melting point.

In the differential thermal curve of the present invention, the endothermic peak ($T_H$) appearing on the high temperature side is considered to be an inherent peak of crystalline polyethylene segments and the endothermic peak ($T_L$) appearing on the low temperature side is considered to be an inherent peak of the crystallized ethylene/α-olefin copolymer segments. The temperatures at which $T_H$ and $T_L$ appear differ according to the mixing ratio and the orientation degree, but these temperatures are generally as follows.

|  | General Range | Preferred Range |
| --- | --- | --- |
| $T_H$ | 150 to 157° C. | 151 to 156° C. |
| $T_L$ | 149 to 155° C. | 150 to 154° C. |
| $T_H$-$T_L$ | 2.5 to 0.5° C. | 2.0 to 1.0° C. |

Some fibers obtained by spinning an ethylene/α-olefin copolymer and drawing the fiber at a high draw ratio show two endothermic peaks, but in these fibers, the high-temperature side peak ($T_H$) is lower than in case of the fiber of the present invention, and the difference ($T_H$−$T_L$) between the two peak temperatures is larger than in the fiber of the present invention.

The ratio of the height ($I_H$) of the peak on the high temperature side to the height ($I_L$) of the peak on the low temperature side in the differential thermal curve should naturally differ according to the blend ratio of both the resins, but it is generally preferred that the $I_H/I_L$ ratio be in the range of from 1.5 to 0.5, especially from 1.4 to 0.6.

The degree of molecular orientation in the shaped body can be known by the X-ray diffractometry, the birefringence method, the fluorescence polarization method or the like. The drawn filament of the ultra-high-molecular-weight olefin resin composition according to the present invention is characterized in that the orientation degree by the half width in the X-ray diffractometry, described in detail, for example, in Yukichi Go and Kiichiro Kubo, Kogyo Kagaku Zasshi, 39, 922 (1939), that is, the orientation degree (F) defined by the following formula:

$$\text{orientation degree } F = \frac{90° - H°/2}{90°} \quad (2)$$

wherein H° stands for the half width (°) of the intensity distribution curve along the Debye ring of the strongest paratroope plane on the equator line, is at least 0.90, preferably at least 0.95.

The drawn filament of the ultra-high-molecular-weight olefin resin composition has such a heat resistance characteristic that the strength retention ratio after the heat history at 170° C. for 5 minutes is 90%, especially at least 95%, and the elastic modulus retention ratio is at least 90%, especially at least 95%. This excellent heat resistance is not attained in any of conventional drawn polyethylene filaments.

The drawn filament of the ultra-high-molecular-weight olefin resin composition of the present invention is excellent in the mechanical characteristics. Namely, the drawn fiber of the ultra-high-molecular-weight olefin resin composition of the present invention has an elastic modulus of at least 30 GPa, especially at least 50 GPa, and a tensile strength of at least 1.5 GPa, especially at least 2.0 GPa.

The drawn fiber of the present invention can be used in the form of a monofilament, multifilament or staple for cords, ropes, woven fabrics and non-woven fabrics or as a reinforcer for various rubbers, resins, cements and the like.

The composition comprising ultra-high-molecular-weight polyethylene and an ultra-high-molecular-weight ethylene/α-olefin copolymer according to the present invention has good spinnability and drawability and can be shaped into a highly drawn filament, and the obtained fiber is excellent in the combination of high strength, high elastic modulus and high creep resistance, and furthermore, the initial elongation can be controlled to a very low level.

Accordingly, if the fiber of the present invention is used as a stress carrier of a fiber-reinforced composite body or other composite body, high strength and high elastic modulus of the fiber can be effectively utilized.

The present invention will now be described in detail with reference to the following examples that by no means limit the scope of the invention.

EXAMPLE 1

A mixture comprising a powder of an ultra-high-molecular-weight ethylene homopolymer (intrinsic viscosity $[\eta]=8.73$ dl/g), a powder of an ultra-high-molecular-weight ethylene/butene-1 copolymer (intrinsic viscosity $[\eta]=9.26$ dl/g, butene-1 content=2.4 branched chains per 1000 carbon atoms) and a powder of a paraffin wax (melting point=69° C., molecular weight=490) was melt-spun under conditions described below. The mixing ratio of the starting materials is shown in Table 1.

TABLE 1

| Sample No. | Ultra-High-Molecular-Weight Ethylene Homopolymer (parts by weight) | Ultra-High-Molecular-Weight Ethylene/Butene-1 Copolymer (parts by weight) | Paraffin Wax (parts by weight) |
| --- | --- | --- | --- |
| 1 | 10 | 20 | 70 |
| 2 | 15 | 15 | 70 |

TABLE 1-continued

| Sample No. | Ultra-High-Molecular-Weight Ethylene Homopolymer (parts by weight) | Ultra-High-Molecular-Weight Ethylene/Butene-1 Copolymer (parts by weight) | Paraffin Wax (parts by weight) |
| --- | --- | --- | --- |
| 3 | 20 | 10 | 70 |

Prior to spinning, 0.1 part by weight of 3,5-dimethyl-tert-butyl-4-hydroxytoluene was added in an amount of 0.1 part by weight as a process stabilizer homogeneously into the mixture.

Then, the mixture was melt-kneaded at a set temperature of 190° C. by using a screw type extruder (screw diameter=25 mm, L/D=25; supplied by Thermoplastic Kogyo), and subsequently, the melt was melt-spun from a spinning die having an orific diameter of 2 mm, which was attached to the extruder. The spun fiber was taken up under drafting conditions in an air gap having a length of 180 mm, and was then cooled and solidified in air to obtain an undrawn fiber shown in Table 2.

TABLE 2

| Sample No. | Fineness (denier) | Draft Ratio | Spinnability |
| --- | --- | --- | --- |
| 1 | 593 | 47 | good |
| 2 | 643 | 43 | good |
| 3 | 643 | 44 | good |

The undrawn fiber was drawn under conditions described below to obtain an oriented fiber. Namely, three-staged drawing was carried out by using four sets of godet rolls. At this drawing operation, the heating medium in first and second drawing tanks was n-decane and the temperatures in the first and second tanks were 110° C. and 120° C., respectively. The heating medium of a third drawing tank was triethylene glycol, and the temperature in the third tank was 145° C. The effective length of each tank was 50 cm. At the drawing operation, the rotation speed of the first godet roll was set at 0.5 m/min, and a fiber having a desired draw ratio was obtained by adjusting the rotation speed of the fourth godet roll. The rotation speeds of the second and third godet rolls were appropriately arranged within such a range that drawing could be stably performed. The majority of the paraffin wax mixed at the initial stage was extracted out in the n-decane tanks.

Incidentally, the draw ratio was calculated from the rotation speed ratio between the first and fourth godet rolls.

Measurement of Tensile Characteristics

The elastic modulus and tensile strength were measured at room temperature (23° C.) by using a tensile tester (Model DCS-50M supplied by Shimazu Seisakusho). The sample length between clamps was 100 mm, and the pulling speed was 100 mm/min. The elastic modulus was calculated from the initial elastic modulus by using the gradient of the tangent. The cross-sectional area of the fiber necessary for the calculation was determined based on the presumption that the density of the fiber was 0.960 g/cc.

Measurement of Creep Resistance Characteristic and Initial Elongation

The creep test was carried out at a sample length of 1 cm and an ambient temperature of 70° C. by using a thermal stress distortion measuring apparatus (Model TMA/SS10 supplied by Seiko Denshi Kogyo) under such an accelerated load condition that a load corresponding to 30% of the breaking load at room temperature was applied. In order to quantitatively evaluate the creep quantity and initial elongation, the elongation EL-60 (%) after 60 seconds from the point of the initiation of application of the load, corresponding to the initial elongation before entrance into the stationary creep state, and the average creep speed $\overset{\circ}{\epsilon}$ ($sec^{-1}$) during the period of from the point of 90 seconds from the initiation of application of the load to the point of 180 seconds from the initiation of application of the load, in which the stationary creep state had already been brought about, were determined.

The tensile characteristics of the sample and the initial elongation and creep characteristics of the sample are shown in Tables 3 and 4, respectively.

TABLE 3

| Sample No. | Draw Ratio | Fineness(denier) | Strength (GPa) | Elastic Modulus (GPa) | Elongation (%) |
| --- | --- | --- | --- | --- | --- |
| 1 | 15 | 10.4 | 2.4 | 62.2 | 4.6 |
| 2 | 18 | 10.1 | 2.7 | 69.4 | 4.8 |
| 3 | 21 | 10.1 | 2.8 | 72.1 | 4.8 |

TABLE 4

| Sample No. | EL-60 (%) | $\epsilon$ ($sec^{-1}$) |
| --- | --- | --- |
| 1 | 2.64 | $1.49 \times 10^{-5}$ |
| 2 | 3.12 | $2.22 \times 10^{-5}$ |
| 3 | 3.46 | $5.56 \times 10^{-5}$ |

As is apparent from the comparison of the results obtained in the present example with the results obtained in the comparative example given hereinafter, in the fiber of the present invention, the initial elongation is improved over that of the fiber formed from the ultra-high-molecular-weight polyethylene or ultra-high-molecular-weight ethylene/butene-1 copolymer alone, and the creep resistance of sample 1 is much improved over that of the fiber composed solely of the ultra-high-molecular-weight ethylene/butene-1 copolymer. The inherent main crystal melting temperatures (Tm) of the compositions of samples 1 through 3 were 135.0° C., 135.6° C. and 136.2° C., respectively. Furthermore, the $I_H/I_L$ ratios of samples 1 through 3 were 1.10, 1.28 and 0.73, respectively.

COMPARATIVE EXAMPLE 1

The ultra-high-molecular-weight ethylene homopolymer and ultra-high-molecular-weight ethylene/butene-1 copolymer described in Example 1 were independently melt-spun in the same manner as described in Example 1. The mixing ratios between the polymer and wax are shown in Table 5.

TABLE 5

| Sample No. | Ultra-High-Molecular-Weight Ethylene Homopolymer (parts by weight) | Ultra-High-Molecular-Weight Ethylene/Butene-1 Copolymer (parts by weight) | Paraffin Wax (parts by weight) |
|---|---|---|---|
| 4 | 30 | — | 70 |
| 5 | — | 30 | 70 |

The undrawn fibers obtained by spinning the mixtures shown in Table 5 are shown in Table 6.

TABLE 6

| Sample No. | Fineness (denier) | Draft Ratio | Spinnability |
|---|---|---|---|
| 4 | 650 | 40 | good |
| 5 | 892 | 35 | good |

The tensile characteristics of the fibers obtained by drawing the undrawn fibers shown in Table 6 are shown in Table 7, and the initial elongation and creep characteristics of these drawn fibers are shown in Table 8.

TABLE 7

| Sample No. | Draw Ratio | Fineness(denier) | Strength (GPa) | Elastic Modulus (GPa) | Elongation (%) |
|---|---|---|---|---|---|
| 4 | 25 | 7.8 | 3.1 | 77.6 | 5.4 |
| 5 | 12 | 22.3 | 2.3 | 42.3 | 6.3 |

TABLE 8

| Sample No. | EL-60 (%) | $\epsilon$ (sec$^{-1}$) |
|---|---|---|
| 4 | 5.40 | $4.51 \times 10^{-5}$ |
| 5 | 4.44 | $2.89 \times 10^{-5}$ |

The inherent main crystal melting temperatures (Tm) of the compositions of samples 4 and 5 are 137.5° C. and 134.8° C., respectively, and the $I_H/I_L$ ratio of the sample 5 was 1.45.

We claim:

1. A drawn, high strength polyolefin fiber comprising a drawn composition which is blend of (A) ultra-high-molecular-weight polyethylene having an intrinsic viscosity ($\eta$) of at least 5 dl/g with (B) ultra-high-molecular-weight ethylene/$\alpha$-olefin copolymer having an intrinsic viscosity ($\eta$) of at least 5 dl/g and containing 0.5 to 10 $\alpha$-olefin groups of at least 3 carbon atoms per 1000 carbon atoms on average, at an (A):(B) weight ratio of 10:90 to 90:10, said composition before drawing having an intrinsic viscosity ($\eta$) of at least 5 dl/g as a whole, and containing 0.2 to 5.0 $\alpha$-olefin groups of at least 3 carbon atoms as side chains per 1000 carbon atoms on the average, and said drawn fiber having the following properties: (i) when measured under restraint conditions using a differential scanning calorimeter, has at least two close crystal melting peaks at temperatures higher by at least 15° C. than the inherent crystal melting temperature (Tm) of the polyethylene determined as the main peak at the time of the second temperature elevation, (ii) an initial elongation of less than 5% when measured 60 second from the time of initiation of application of a load, corresponding to 30% of the breaking load applied at room temperature to a test sample 1 cm long, at ambient temperature of 70° C., (iii) an average creep rate of at least $1 \times 10^{-4}$ sec$^{-1}$ when measured over the period of from 90 to 180 seconds after the time of initiating the application of said load, (iv) a strength retention ratio of at least 90% when measured after a heat history at 170° C. for 5 minutes, (v) an elastic modulus of at least 30 GPa at room temperature, and (vi) a tensile strength of at least 1.5 GPa.

2. A polyolefin fiber as set forth in claim 1, wherein of said at least two crystal melting endothermic peaks, the endothermic peak ($T_H$) on the high temperature side and the endothermic peak ($T_L$) on the low temperature side appear at temperatures satisfying the requirements of $T_H = 150°$ to 157° C., $T_L = 149°$ to 155° C. and $T_H - T_L = 2.5°$ to 0.5° C., and the ratio ($I_H/I_L$) of the height ($I_H$) of the peak on the high temperature side to the height ($I_L$) of the peak on the low temperature side is in the range of from 1.5 to 0.5.

3. A polyolefin fiber as set forth in claim 2, wherein $T_H$ and $T_L$ appear at temperatures satisfying the requirements of $T_H = 151°$ to 156° C., $T_L = 150°$ to 154° C. and $T_H - T_L = 2.0°$ to 1.0° C., and the ratio $I_H/I_L$ is in the range of from 1.4 to 0.6.

4. The drawn, high strength fiber of claim 1 wherein the composition of (A) and (B) has an intrinsic viscosity of from 7 to 30 dl/g and from 0.5 to 3.0, on average, of $\alpha$-olefin groups of at least 3 carbon atoms as side chains per 1000 carbon atoms, and wherein the difference in the intrinsic viscosity between polyethylene (A) and copolymer (B) is less than 3 dl/g.

5. The drawn, high strength polyolefin fiber of claim 1 which has been drawn to a draw ratio of at least 10.

* * * * *